May 1, 1951     W. W. ALLEN     2,550,952
V-BELT SPEED CHANGER
Filed April 30, 1948     2 Sheets-Sheet 1
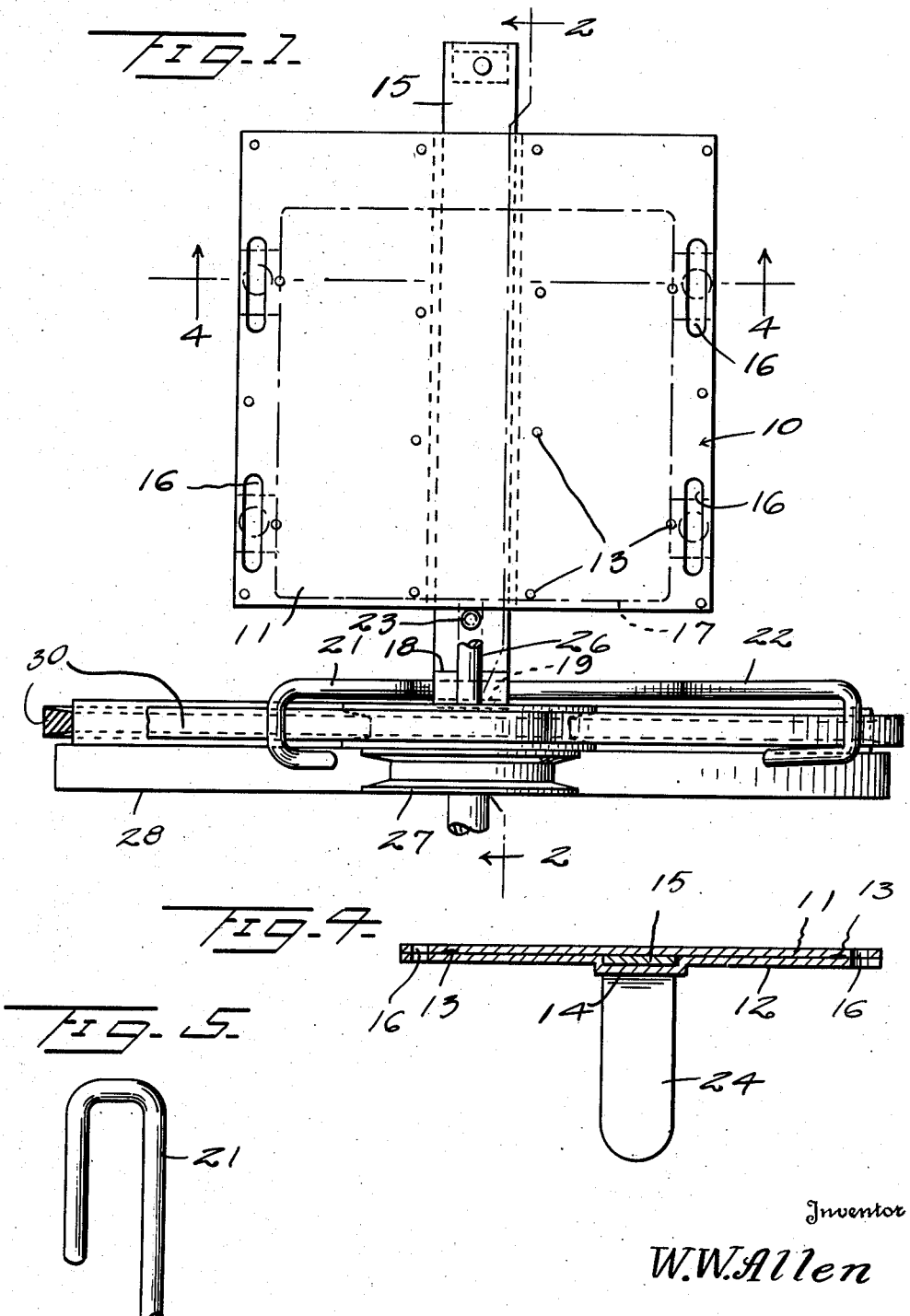
Inventor
W. W. Allen
By Kimmel & Crowell
Attorneys

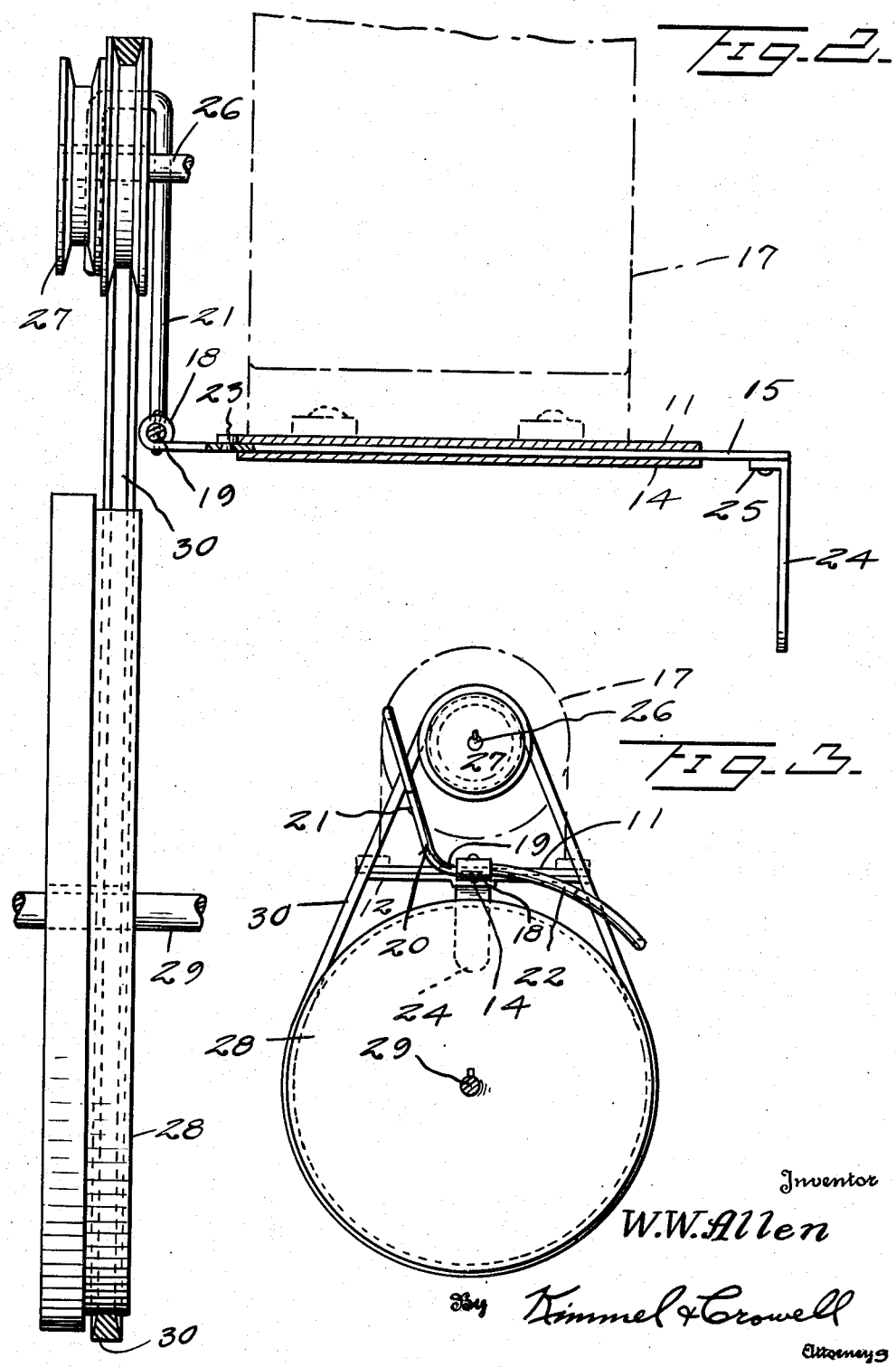

Patented May 1, 1951

2,550,952

UNITED STATES PATENT OFFICE 2,550,952

V-BELT SPEED CHANGER

William Wallace Allen, Jacksonville, Fla., assignor to American Coolair Corporation, Jacksonville, Fla.

Application April 30, 1948, Serial No. 24,366

2 Claims. (Cl. 74—242.3)

This invention relates to speed changers for V-belts.

An object of this invention is to provide an improved speed changer whereby the speed of the driven pulley can be changed while the driving pulley is operating, and one of the pulleys is formed with V-grooves whereas the other pulley is flat.

Another object of this invention is to provide a speed changer or belt shifter wherein the guide for shifter forms the base for the motor or power member.

A further object of this invention is to provide a speed changer which includes a pair of shifter members correlated one with the driving pulley and one with the driven pulley so that both runs of the belt will be positively shifted.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a plan view of a belt shifting device constructed according to an embodiment of this invention.

Figure 2 is a sectional view taken on the line 2—2 of Figure 1.

Figure 3 is a detailed end elevation of the device.

Figure 4 is a sectional view taken on the line 4—4 of Figure 1.

Figure 5 is a fragmentary plan view of one of the belt shifting hooks.

Referring to the drawings, the numeral 10 designates generally a guide plate structure embodying an upper flat plate member 11 and a lower plate member 12 fixed to the upper plate member 11 by spot welding or other fastening means 13. The lower plate member 12 is formed with a channel-shaped and downwardly offset guide member 14 extending lengthwise of the plate 12 and within which an elongated flat slide member or bar 15 is adapted to loosely engage. The two plate members 11 and 12 are formed with registering elongated openings or slots 16 through which bolts or the like are adapted to engage for securing a motor or power member 17 on the upper plate member 11. The forward end of the slide bar 15 is formed at its forward end with an eye or loop 18 through which the horizontal intermediate portion 19 of an elongated shifter rod, generally designated as 20, is adapted to be engaged.

The intermediate portion 19 of the rod 20 is fixed by any suitable means within the eye 18 and one end of the intermediate portion 19 is extended upwardly at an obtuse angle and formed into a belt shifting hook member 21. The opposite end of the intermediate portion 19 is extended downwardly at an obtuse or oblique angle oppositely from the hook member 21 and formed into a second hook member 22. The slide bar 15 is limited in its movement in one direction by means of a stop member 23 and the inner or rear end of the slide member 15 has fixed thereto a depending handle 24 which forms a second or inner stop member 25.

The power member 17 has fixed to the drive shaft 26 thereof a stepped and grooved pulley 27. A stepped pulley 28 is fixed to a driven shaft 29 and the steps of the pulley 28 are flat. An endless V-belt 30 is trained about the pulley 27 engaging in one of the grooves thereof and the belt 30 is also trained about the pulley 28 engaging on one of the steps of the latter pulley. The two hook members 21 and 22 engage the two runs of the belt 30 as shown in Figure 3, the belt shifter hooks being extended to a point closely adjacent the initial contacting point of the belt with a pulley.

The two hooks 21 and 22 are offset one from the other so that one hook will initially start disengagement of the belt from one pulley ahead of the other hook. When shifting from the larger diameter groove of pulley 27, hook 21 will shift belt 30 to the smaller diameter groove before hook 22 shifts belt 30 from the smaller diameter portion of pulley 28 to the larger diameter portion of pulley 28. On the reverse operation hook 22 operates to shift the belt ahead of hook 21.

In the use and operation of this shifter the belt 30 is trained about the two pulleys 27 and 28 engaging in one of the grooves of pulley 27 and engaging a complementary flat portion of pulley 28. When it is desired to shift the belt 30, as an example, from the larger diameter groove to the smaller diameter groove, slide bar 15 is moved to the left as viewed in Figure 2. This will cause hook member 21 to force the belt from the larger diameter groove of pulley 27 into the smaller diameter groove and hook member 22 subsequently will force its associated run of the belt to ride onto the larger diameter flat surface of pulley 28.

I claim:

1. A belt shifter for a belt trained over a pair of stepped pulleys comprising a guide extending parallel to the axis of rotation of said pulleys, an elongated slide member slidably engaging said guide, a transverse shifter rod carried by said slide member, said rod having hook-shaped belt engaging portions on the opposite ends thereof, each of said opposite ends being fixedly offset relative to a plane at right angles to said axis of rotation in the direction of the smaller diameter portion of the adjacent pulley whereby the belt will be shifted from the greater diameter portion to the smaller diameter portion of one pulley ahead of the shifting of the belt on the other pulley.

2. In combination with a pair of parallel axially spaced apart stepped pulleys disposed with the lesser diameter portion of one of said pulleys in driving alignment with the greater diameter portion of the other, and a belt trained about said pair of pulleys; a belt shifter comprising a guide member disposed between the axis of rotation of said pulleys, a slide member engaging said guide and adapted to be slidably moved in a direction parallel to said axis of rotation, a transverse shifter rod carried by said slide member, the opposite ends of said rod being oppositely bent for disposition adjacent to said pair of pulleys, said opposite ends being formed with reverted hooked portions for engagement with said belt, each of said hooked portions being fixedly offset relative to a plane at right angles to said axis of rotation in the direction of the lesser diameter portion of the adjacent pulley whereby said belt will be shifted from the greater to the lesser diameter portion of one of said pulleys ahead of the shifting of the belt on the other of said pulleys.

WILLIAM WALLACE ALLEN.

REFERENCES CITED

The following references are of record in the file of this patent:

UNITED STATES PATENTS

| Number | Name | Date |
|---|---|---|
| 704,203 | Moorhouse | July 8, 1902 |
| 1,469,856 | Traufler | Oct. 9, 1923 |

FOREIGN PATENTS

| Number | Country | Date |
|---|---|---|
| 229,262 | Great Britain | July 16, 1925 |